US006332720B1

(12) United States Patent
Shimaoka et al.

(10) Patent No.: US 6,332,720 B1
(45) Date of Patent: Dec. 25, 2001

(54) SEMICONDUCTOR LASER COUPLING DEVICE AND METHOD FOR ASSEMBLING THE SAME ON CIRCUIT BOARD

(75) Inventors: Makoto Shimaoka, Ushiku; Tadaaki Ishikawa, Tsuchiura; Kazuyuki Fukuda, Ibaraki-ken; Katsumi Kuroguchi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/391,091

(22) Filed: Sep. 16, 1999

(30) Foreign Application Priority Data

Sep. 17, 1998 (JP) .................................................. 10-262711

(51) Int. Cl.[7] ...................................................... G02B 6/36
(52) U.S. Cl. .................................. 385/88; 385/92; 385/94
(58) Field of Search .................................... 385/88, 90, 91, 385/92, 94; 359/820

(56) References Cited

U.S. PATENT DOCUMENTS 5,737,467 * 4/1998 Kato et al. ............................... 385/92
6,130,444 * 10/2000 Hashizume et al. ..................... 257/81

FOREIGN PATENT DOCUMENTS

9152527-A * 6/1997 (JP) ................................. G02B/6/42

* cited by examiner

Primary Examiner—Georgia Epps
Assistant Examiner—David N. Spector
(74) Attorney, Agent, or Firm—Antonelli, Terry, Stout & Kraus, LLP

(57) ABSTRACT

When an optical system is housed in a plastic case, an optical connection in the system might be changed by a deformation of the case due to heat and thermal resistance might be increased. It is important that the case has not only a function of housing the elements of the optical system, but also a function of ensuring that light is stably produced in the optical system, which, is the most important function of the case.

Therefore, the deformation of the case due to a change in temperature is prevented by a frame inserted into the opening portion of the case and further by mounting the case on an external aluminum substrate. That is, stability in the optical connection is improved by improving the structure of the case and by mounting an case on the external substrate. Further, an increase in the thermal resistance is prevented in the same way by provision of the frame and the external aluminum substrate.

12 Claims, 6 Drawing Sheets

SEMICONDUCTOR LASER COUPLING DEVICE AND METHOD FOR ASSEMBLING THE SAME ON CIRCUIT BOARD

BACKGROUND OF THE INVENTION

The present invention relates to a semiconductor laser coupling device for applying light to and receiving light from an optical fiber; and, more particularly, the invention relates to a semiconductor laser coupling device in which a light-receiving element, a laser element, and an optical fiber are aligned with each other on a substrate and are coupled to each other and are assembled in a case, to product an assembly which is suitable for outputting light to the outside, and to a method of mounting the assembly on a circuit board.

A conventional case of assembling a semiconductor element in an optical module is disclosed in Japanese Patent Laid-Open No. 152527/1997. The optical module described in this publication comprises an optical fiber, a substrate on which an optical element is mounted, a cap for fixing the optical fiber in position on the substrate, and a micro-capillary into which the optical fiber is inserted, the optical fiber being inserted into and fixed to the micro-capillary. A portion of the optical fiber having a length nearly equal to the micro-capillary is inserted into the micro-capillary to cause the tip end thereof to protrude from the tip end of the micro-capillary, and the protruding end of the optical fiber is arranged on a V-shaped groove on the substrate and is fixed thereto by the cap, whereby it is optically coupled to the optical element. The optical element and the optical fiber are then packaged by resin molding.

In the above-mentioned conventional optical module, the constituent parts for stable optical coupling of the optical module, that is, the substrate, the optical fiber, the micro-capillary, and the resin, which are constituent members of the optical module, are made of different kinds of materials and are coupled to each other. Therefore, when each member is subjected to a change in temperature, a thermal stress is produced in the members. That is, when the members made of different materials are expanded or constricted by a change in temperature, they are each subjected to a different amount of expansion or constriction, whereby they are bent. In the conventional optical module, no consideration is given to the fact that this bending deformation produces an optical axis deviation in the optical coupling of the optical element to the optical fiber.

Further, when an electric current is switched on the optical element to laser light, heat is produced at the same time. In some instances, depending on the structure or the material of the case, in particular, when using a resin case, the following problems are produced: heat dissipation takes a long time because the thermal conductivity of the resin is low, which increases the temperature of the semiconductor and reduces the optical output and produces a change in optical output and a change in lasing wavelength with a lapse of time.

SUMMARY OF THE INVENTION

An object of the present invention is to provide a semiconductor laser coupling device which solves the above described problems and has a high accuracy and a long life.

In order to achieve the object described above, the present invention provides a semiconductor laser element, which is optically coupled to an optical fiber, and a light-receiving element, which is provided for monitoring the light of the semiconductor laser element provided, and these elements are assembled in a case whose main component is resin. A reinforcing member having a strength higher than the resin and having a constraining force is provided at the bottom portion of the case and a further reinforcing member is provided at the opening portion of the case. The elements described above are assembled in the case and embedded by pouring resin in the case.

DESCRIPTION OF THE PREFERRED EMBODIMENTS

One preferred embodiment in accordance with the present invention will be described with reference to FIG. 1(a) to FIG. 3(d).

Figure 1A:
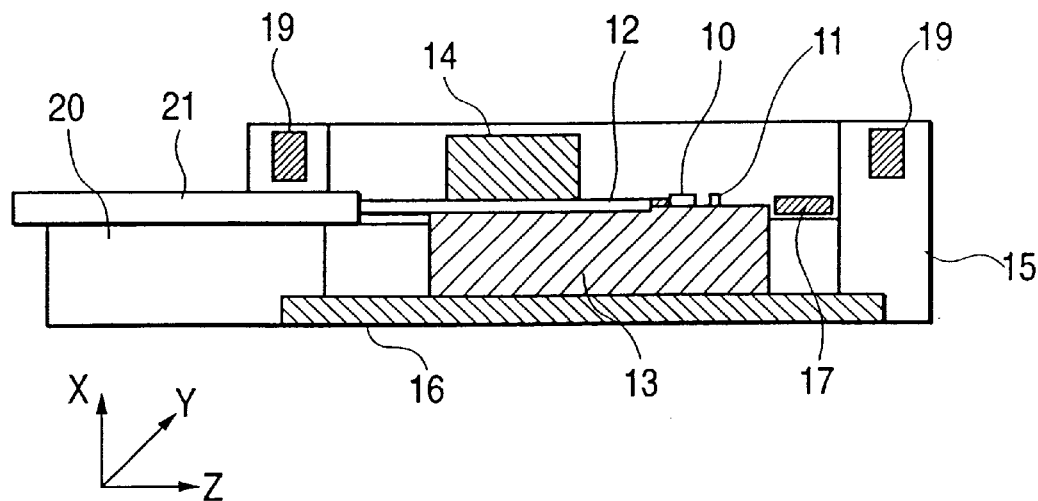
FIG. 1(a) is a longitudinal sectional view of a semiconductor laser coupling device representing one preferred embodiment in accordance with the present invention.

FIG. 1(a) shows a semiconductor light emitting device in which a semiconductor laser element 10 is made to emit light in response to an electrical signal from an external electrode, and the emitted light is directed into an optical fiber 12, thereby to deliver the emitted light to another location via the optical fiber. A semiconductor light receiving device in which a semiconductor light receiving element 11 is mounted at the position of the semiconductor laser element 10 such that it receives light from the optical fiber 12 has the same construction as the semiconductor light emitting device. The semiconductor light emitting device and the semiconductor light receiving device will collectively be called a semiconductor laser coupling device in the following description.

The semiconductor laser element 10 and the semiconductor light receiving element 11 are bonded to a substrate comprising an Si single crystal (crystal face: (100)) by solder, such as Au—Sn or the like.

The semiconductor laser element 10 is an end surface light-emitting element which emits light from the right and left end surfaces of the element (z direction in FIG. 1(a)). Although a conventional semiconductor laser element 10 emits light at a radiation angle of 30 to 40 degrees, in order to increase the optical coupling rate to the optical fiber 12, it is desirable when the radiation angle is close to an angle of incidence of light entering the optical fiber 12. To be more specific, a mode-enlarging structure is provided in the light-emitting portion of the semiconductor laser element so that the radiation angle of the semiconductor laser element 10 is 10 to 15 degrees.

Figure 1B:
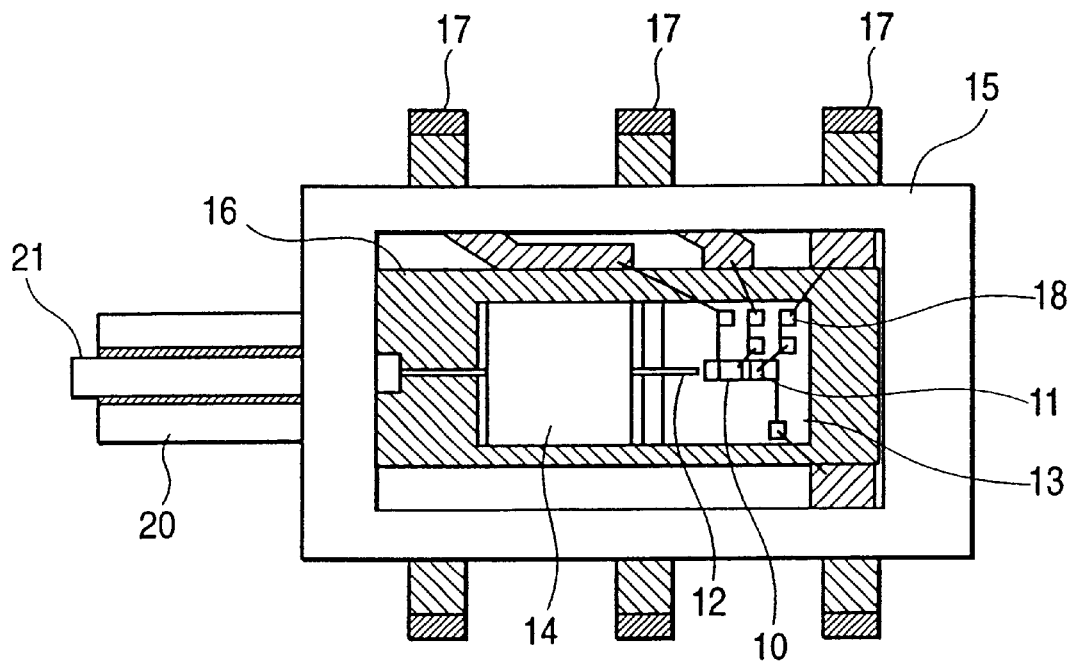
FIG. 1(b) is a plan view of FIG. 1.

A single mode fiber (outer diameter: 125 μm) is used as the optical fiber 12 and, in order that the light is effectively directed into a core (outer diameter: 7 μm) portion which transmits the light in the optical fiber, it is important that the light-emitting end of the semiconductor laser element is aligned in a proper position relative to the end of the optical fiber (in the X, Y directions in FIG. 1(*a*)). An amount of deviation in position of about 2 μm in a direction perpendicular to an optical axis (in the X, Y direction) between the light emitting end of the semiconductor laser element 10 and the end portion of the optical fiber 12 will cause a relative deviation of 1 dB in the light being transmitted. Therefore, in order to make a highly reliable semiconductor laser coupling device, it is necessary to correctly fix the optical fiber 12 and the semiconductor laser element 10 at predetermined positions. Accordingly, in order to fix the semiconductor laser element 10 with good accuracy, a metallized film and a marker are formed near the center of the Si substrate, and the semiconductor laser element 10 is positioned on the Si substrate by a passive alignment method so that the marker on the Si substrate is aligned with the marker made on the semiconductor laser element 10. Then, the semiconductor laser element 10 is soldered to the Si substrate. The semiconductor light receiving element 11 is fixed to the Si substrate in the same way.

On the other hand, in order to make it possible to stably fix the optical fiber 12, the optical fiber 12 is fixed in a V-shaped groove formed on the Si substrate 13 in the direction of the emitting light (in the Z direction) from the position of a light-emitting point of the semiconductor laser element 10, which is connected by the above-described method. The V-shaped groove can be formed with a high accuracy of ±0.5 μm or more by an anisotropic etching method with an angle of 70.6 degrees to the top surface of the Si substrate 13. Since the optical fiber 12 is fixed along the V-shaped groove, the optical fiber 12 can be prevented from deviating on the Si substrate 13 and can be positioned at the correct position.

The optical fiber 12 is bonded and held to the Si substrate 13 not only by the V-shaped groove, but also by a press plate 14. The optical fiber 12 can be stably fixed to the Si substrate 13 by suitably shaping the part of the press plate 14 which is in contact with the optical fiber 12. Preferably, the press plate 14 has a V-shaped groove at a portion in contact with the optical fiber 12, but in place of the V-shaped groove, a U-shaped groove or a square groove may be used. A gap of 5 to 8 μm is suitable for a bonding gap between the press plate 14 and the Si substrate 13. The gap is not limited to this value, but it may be 5 μm or less. The same Si single crystal material as the Si substrate 13 is suitable for the material of the press plate 14.

The order of assembly is as follows: the metallized film and the marker are formed at predetermined positions on the Si substrate 13 and then the V-shaped groove is formed by anisotropic etching; the semiconductor laser element 10 and the semiconductor light receiving element 11 are bonded to the surface of the Si substrate 13; then, the optical fiber is placed along the groove of the Si substrate 13 and its position is adjusted such that it is in parallel to the optical axis and such that the distance between it and the semiconductor laser element 10 is the most suitable; then, the press plate 14 is placed on the optical fiber 12 and bonded thereto using an adhesive; then, the Si substrate 13 with the optical fiber 12 is assembled in a case 15 and is bonded to the center of the bottom surface of the case 15; then, the optical fiber 12 is guided out through a hole made through the side wall of the case 15 to which a U-shaped fiber guide 20 is fixed for protecting the optical fiber 12.

The optical fiber 12 is basically covered with a nylon coating 21 protecting itself against an external force, and when the optical fiber 12 is mounted on the Si substrate 13, the coating 21 is removed to fix the optical fiber 12 with high positioning accuracy and with reliability. A plate 16 with good thermal conductivity is mounted on the bottom surface of the case 15.

After having been assembled in the case 15, an external electrode terminal 17 and a respective electrode 18 on the Si substrate 13 are electrically connected to each other. The external electrode terminals 17 are mounted on the side wall of the case, as shown in FIG. 1(*a*), such that each external electrode terminal 17 is at the same level from the bottom surface of the case as the top surface of the Si substrate 13. Finally, a resin is potted on the semiconductor laser element 10 and the semiconductor light receiving element 11 to protect them against dust, moisture, and the like.

Figure 2:
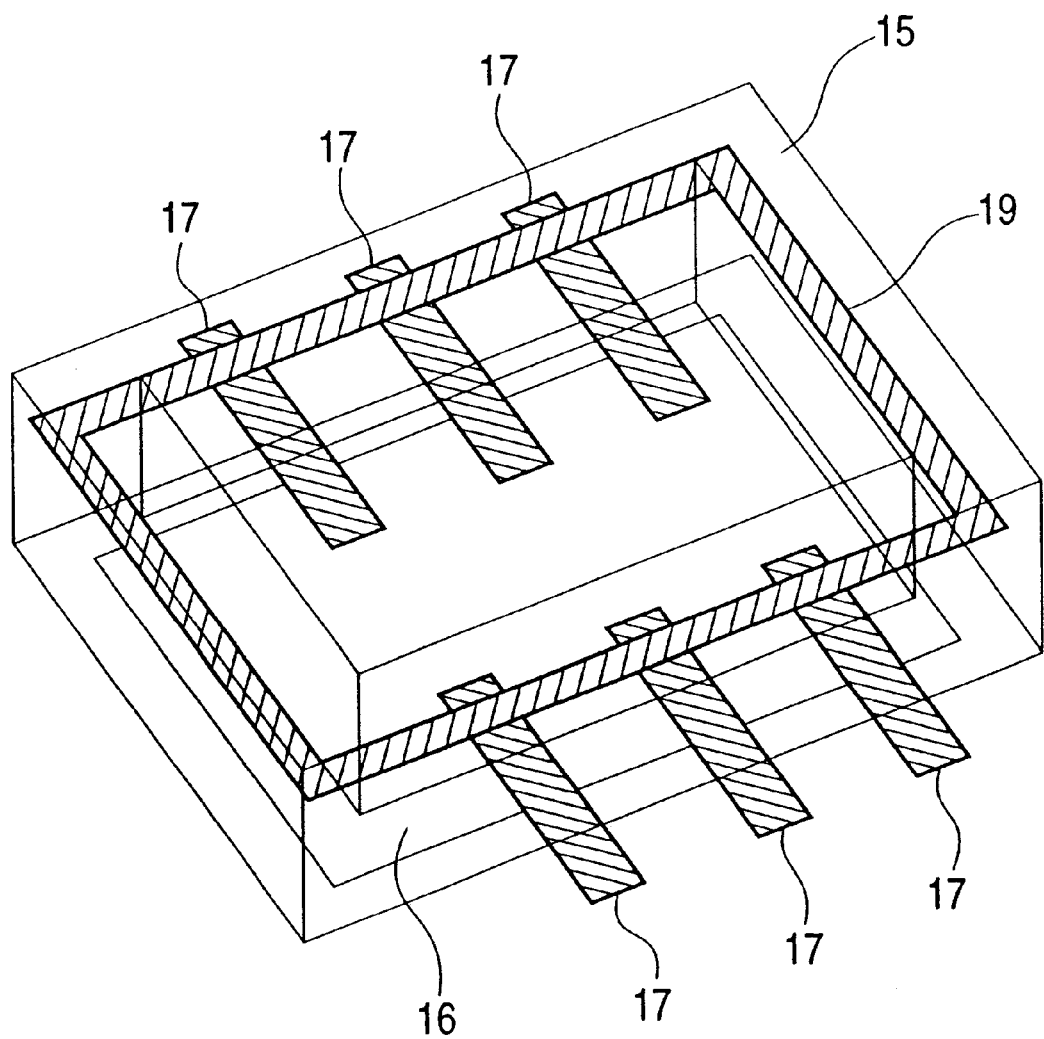
FIG. 2 is a perspective view showing the inside of a case configured in accordance with the present invention.
Figure 3A:
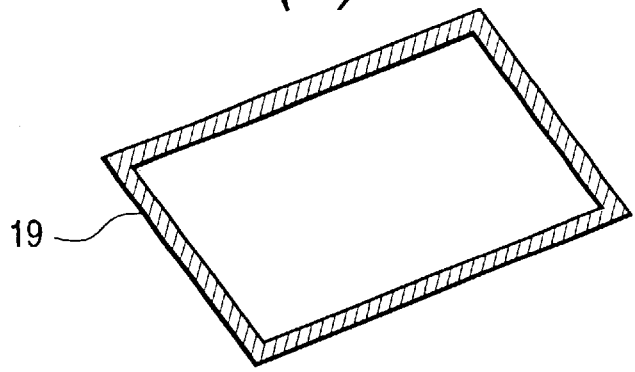
FIGS. 3(a) to 3(d) are diagrams which illustrate the parts of a case configured in accordance with the present invention.
Figure 3D:
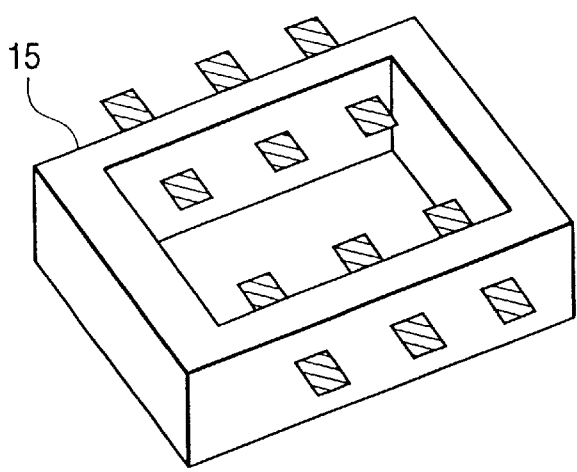
Figure 3B:
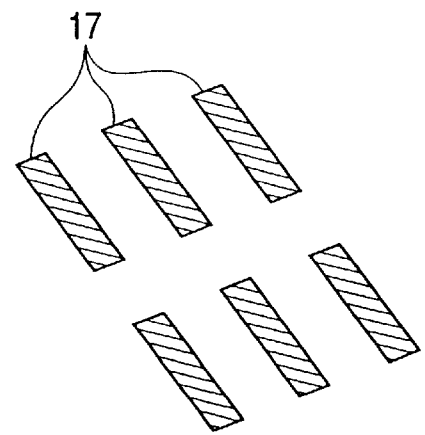
Figure 3C:
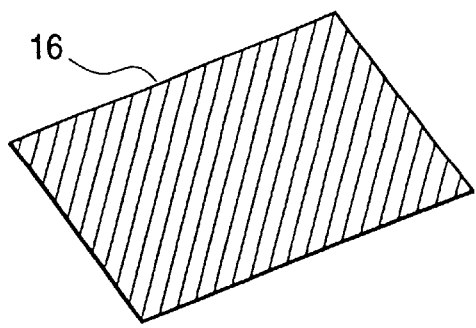
Figures 4A, 4B, 4C, 4D:
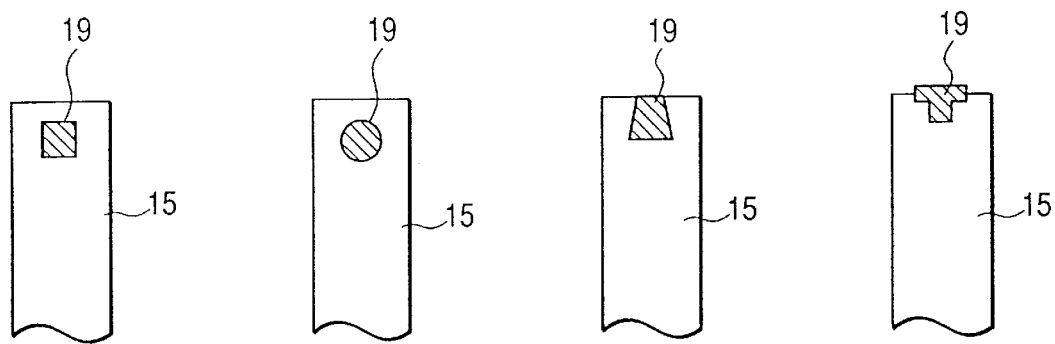
FIGS. 4(a) to 4(d) are diagrams showing in cross-section different examples of a frame 19 in accordance with the present invention.

Next, one preferred embodiment of the inside structure of the case 15 will described with reference to the perspective view in FIG. 2 and the illustration of the parts in FIGS. 3(*a*) to 3(*d*).

In the fundamental structure of the case 15 of the present preferred embodiment, a plate 16 having a size of approximately 80% of the bottom surface of the case is inserted into the bottom of the case as a reinforcing member having a good heat dissipativity, and a square frame 19 is inserted into a portion near to the top surface of the case as a reinforcing member. Then, resin is poured. In addition, the external electrode terminals 17 for electrical connection to an external part are mounted at a middle portion between the top and bottom surfaces of the case. It is suitable that the relation between the height of the external terminals 17 and that of the square frame 19 is such that the square frame 19 is mounted, as shown in FIG. 1(*a*), at least above the external electrode terminals 17 and near to the top surface of the case.

The main constitutional material of the case 15 is a resin, and the plate 16 is fixed by the resin at the periphery thereof and the square frame 19 is embedded in the resin.

Epoxy, PBS (polybutyl styrene), liquid crystal polymer and the like are suitable for use as the resin, or a mixture of these resins with fillers (glass, AlN, $Al_2O_3$, quartz, carbon powder, aluminum powder, or silver powder) or glass fiber is also suitable, and, in addition to a resin, a mixture of ceramic with copper powder, aluminum powder, silver powder produces the same effects.

FIG. 3(*a*) shows the frame 19, FIG. 3(*b*) shows the external electrode terminals 17, FIG. 3(*c*) shows the plate 16 which is fixed to the bottom surface of the case, and FIG. 3(*d*) shows the appearance of the resin case 15 made by pouring a resin on these parts.

The parts shown in FIG. 3(*a*), FIG. 3(*b*), and FIG. 3(*c*) may be separate parts or they may be integral with each other. A metal frame made of Sn-containing Cu(Cu-1.0Sn), Fe-containing Cu-(Cu-1.5Fe), or CuW(Cu-30W), or a ceramic frame made of SiC, SiN, or AlN is suitable for use as the plate 16 inserted into the bottom of the case. The frame 19 may be made of the same material as the plate 16. Further, one plate may be three-dimensionally etched into or plastically deformed into one integral structure to form the frame 19 and the plate 16. The frame 19 is not necessarily square in the strictest sense, and may be shaped in the form of a polygon having a shape close to a continuous square. Further, small dips or bumps on the surface of the frame 19 are preferable because they put the frame 19 into further tight mechanical contact with the resin.

Examples of the cross sectional shape of the frame 19 are shown in FIG. 4(a) to FIG. 4(d). As shown in FIG. 4(a) to FIG. 4(d), the cross section of the frame 19 may be (1) square, (2) circular, (3) trapezoidal, or (4) T-shaped and protruding from the top surface of the case.

The deformation of the case on the Si substrate inserted into and fixed to the case produced at the time when the temperature of the whole case is increased from 25° C. to 85° C. was determined by experiments for the two structural examples in which (1) a metal plate (Cu-1.0Sn) is inserted only into the bottom of the case and (2) a metal plate (Cu-1.0Sn) is inserted into the bottom of the case and a square made from (Cu-1.0Sn) inserted into the top portion of the case. The resin used was PBS base resin and the size of the Si substrate was 2 mm wide and 4 mm long, with the deformation of the Si substrate being measured in the direction of the length of 4 mm.

Figure 5:
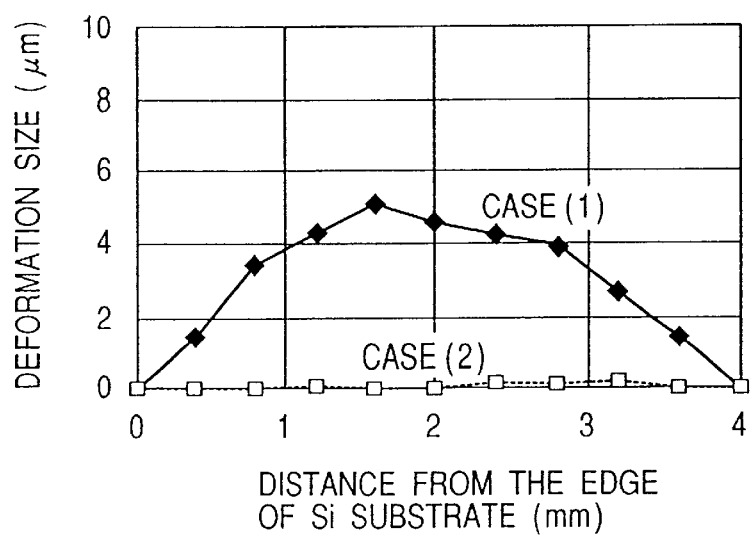
FIG. 5 is a graph showing the results of measurements of deformation caused by a change in temperature of the surface of a Si substrate.

The results of measurement of the deformation of the Si substrate are shown in FIG. 5. The measurements were performed at the center of the width (2 mm) of the Si substrate. While there was a difference of 5 $\mu$m in deformation between the center of the Si substrate and the end thereof in the case (1), there was a difference of only 0.2 $\mu$m or less in deformation in the case (2); that is, the Si substrate with no frame 19 was deformed convexly.

The reason why there was a difference in deformation between the case (1) and the case (2) is that the thermal expansion coefficient of the resin is larger than that of the metal plate and that the center of the bottom of the case protruded convexly upward as the temperature of the case was increased. In particular, in the case (1), the top portion of the case was expanded largely to produce a large deformation. On the other hand, in the case (2), the square frame inserted into the top portion of the case constrained the thermal expansion of the resin as compared with the thermal expansion of the resin itself to make the amount of expansion of the case bottom nearly equal to that of the case top, which prevented the case from bending.

If the case bends, the Si substrate bonded and fixed to the bottom of the case is also deformed. The optical fiber 12 and the semiconductor laser element 10 which are bonded to the surface of the Si substrate 13 are arranged in the direction of the length of the Si substrate 13. Therefore, if the Si substrate 13 is deformed, the angle of the end surface of the optical fiber 12 and that of the semiconductor laser element 10 are changed so as to produce an adverse effect on the optical coupling, which results in a change in the optical coupling with a change in temperature. Therefore, in the case (2), that is, in the resin case in which the metal frames are inserted into the bottom of the case and in the portion near the top of the case, even if the temperature is changed, the optical coupling is not changed. Thus, the case (2) represents a semiconductor laser coupling device which produces a stable optical output over a wide temperature range.

There are some other methods for controlling the deformation of the case when the temperature of the case is changed. In one method, a cover is bonded to the opening of the top surface of the case; in another method, the ends of the cover are folded inside to cover the opening; and, in a third method, a cover provided with a spring force is fitted in the opening of the case. However, the cover bonded to the opening of the case produces a problem in that the bonded portion may be easily separated or deformed and can not be used for a long period of time. The cover fitted in the opening of the case also produces a problem in that, if the case is used for a long period of time, the resin of the case yields to reduce the spring force.

According to the present invention, the frame 19 embedded in the resin prevents the case from being deformed without the need for bonding the cover to the case or making the resin yield, thereby producing an effect of preventing a change in optical coupling.

Figure 6:
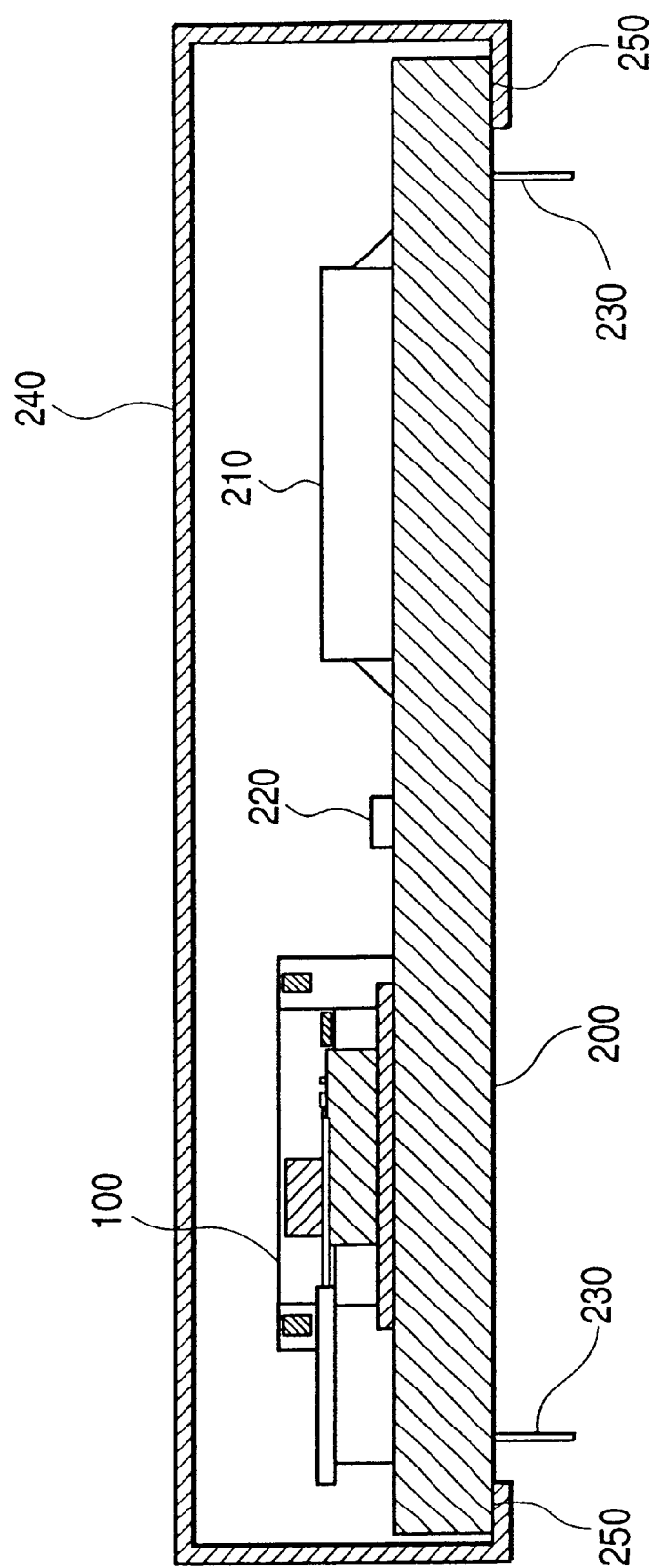
FIG. 6 is a side section view of one embodiment in which a semiconductor laser connecting device in accordance with the present invention is mounted on an external circuit substrate.

FIG. 6 is a cross sectional view of an assembly in which the semiconductor laser coupling device 100 is mounted on a circuit board 200.

The circuit board 200 has a hybrid circuit constituted by an IC 210 for controlling the operation of the semiconductor laser coupling device 100, a resistance constituting a circuit, and the like. The circuit board 200 is an alumina ceramic board provided with multilayer wiring and has a PGA terminal 230 easily mounted on a circuit board (not shown). The semiconductor laser coupling device 100 uses a SOP signal terminal as an external output terminal and the SOP signal terminal is soldered to the bottom surface of the case after applying thermally conductive grease to the bottom surface of the case. The external terminal of the case is a SOP terminal having an international pin arrangement. This produces an effect that the semiconductor laser coupling device 100 can be easily mounted on the external circuit.

The terminal of the IC 210 is a QFP (Quad Flat Package) and is similarly mounted on the flat plane. The circuit board 200 is surface-mounted with a hybrid circuit, the semiconductor laser coupling device 100 or the like and then is provided with a metal cover 240 to cover the whole unit, the circuit board 200 and the metal cover 240 being fixed to each other with solder 250. It is not necessary to fix the whole periphery of the circuit board 200, but only half or more of the whole periphery need be bonded.

In the semiconductor laser coupling device 100, as described above, the metal frame 16 made of Cu-1.0Sn, Cu-1.5Fe, or Cu-30W, or a ceramic frame made of SiC, SiN, or AlN is inserted into the bottom of the case. If thermally conductive grease is applied to the bottom of the case and the circuit board 200, the heat of the semiconductor laser coupling device 100 can be quickly dissipated.

Further, since the metal cover 240 is bonded to the circuit board 200, the metal cover 240 can also dissipate the heat. Brass (Cu-3OZn), copper (Cu), or SPCC is suitable for the material of the metal cover 240. If fins shaped like bumps and dips are formed on the surface of the metal cover 240, they can improve the heat dissipation effects. Further, the metal cover 240 has an effect of electrically shielding the hybrid circuit and, hence, can produce a stable lasing wavelength and an optical output without increasing the temperature of the semiconductor laser element. Since the circuit board 200 is provided with the PGA terminal 230 having an international pin spacing, it can be mounted on an external board substrate of any type.

According to the preferred embodiment, the frame 19 is inserted into the portion near to the opening of the case receiving the Si substrate, on which the optical fiber, the semiconductor laser element, and the semiconductor light receiving element are mounted, and the thermally conductive plate 16 is inserted into the bottom of the case. This constitution can prevent the Si substrate from being deformed when the whole module is subjected to a change in temperature. Therefore, this constitution does not produce a change in optical coupling between the semiconductor laser element and the optical fiber or between the semiconductor light receiving element and the optical fiber and can produce a stable optical input/output and a stable lasing wavelength. Further, since the thermally conductive plate 16 is inserted into the bottom of the case and the case is mounted on the external circuit substrate and the whole external circuit substrate is covered with a cover, a stable optical input/output and a stable lasing wavelength can be produced even if the outside temperature is changed.

Next, another arrangement of the semiconductor laser coupling device mounted on a circuit board in accordance with the present invention will be described with reference to FIG. 7(a), which is a plan view of the arrangement of the semiconductor laser coupling device, and FIG. 7(b), which is a cross sectional view taken on a line A–A' in FIG. 7(a).

In this preferred embodiment, the bottom cover 240B is divided into a portion to accommodate the circuit board 200 and a heat-dissipating block 240C to be provided with the semiconductor laser coupling device.

The bottom cover 240B is formed of plastic, plastic plated with metal, or a thin iron or aluminum plate.

Aluminum, stainless steel (SUS430), or copper is suitable for the material of the heat-dissipating block 240C and the heat-dissipating block 240C has fins on the surface thereof to increase the heat-dissipating area.

Figure 7A:
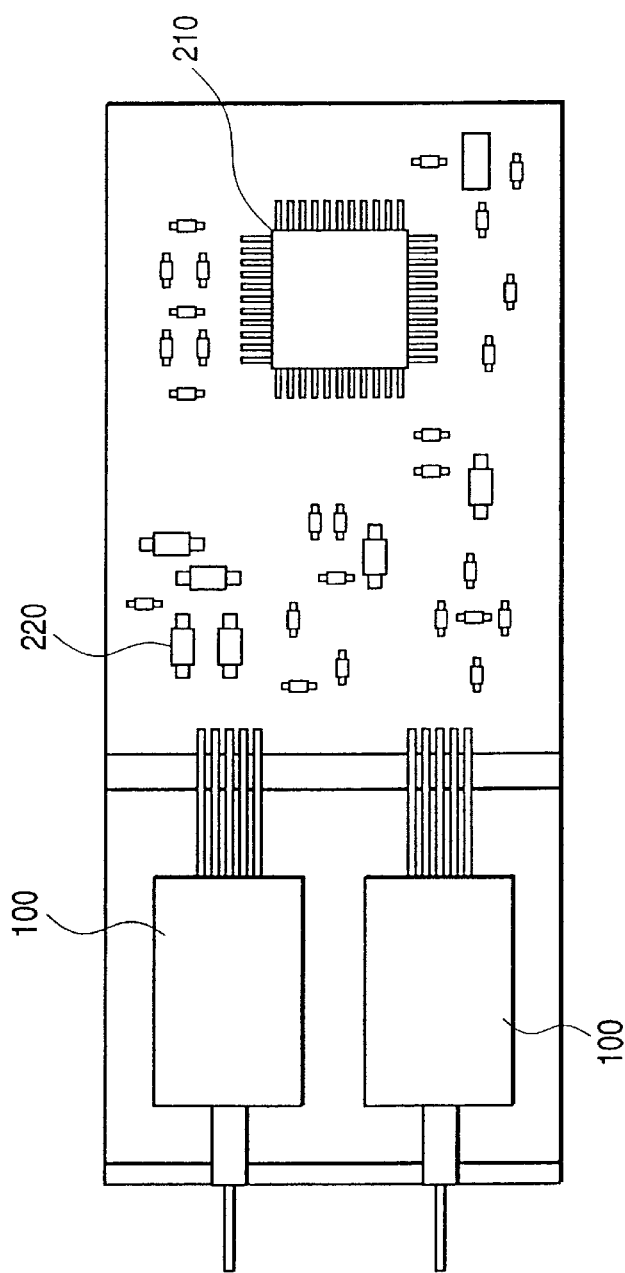
FIGS. 7(a) and 7(b) are top plan and side sectional views, respectively, of another embodiment in which a semiconductor laser connecting device in accordance with the present invention is mounted on an external circuit substrate.
Figure 7B:
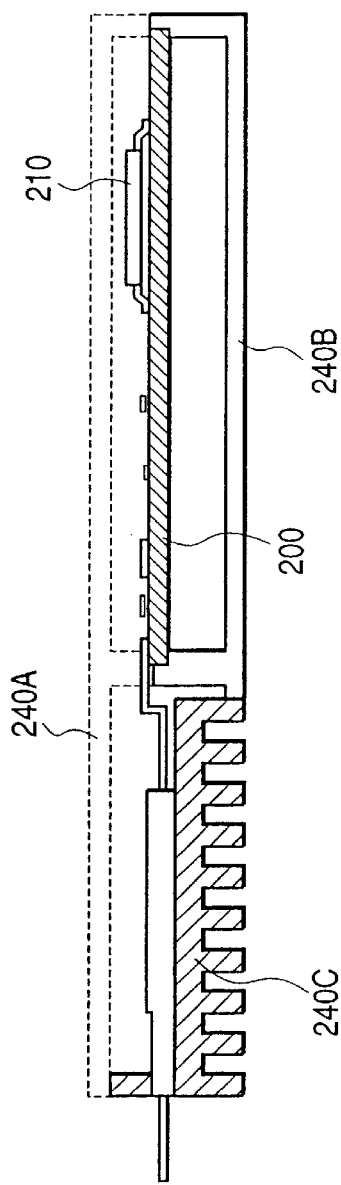

In the plan view in FIG. 7(a), two semiconductor laser coupling devices are shown, one being a receiving device and the other being a lasing device.

The semiconductor laser coupling devices are mounted on the circuit board 200 as follows: electrical parts, such as a resistor 220, a control IC 210, a condenser, and the like, are bonded and fixed to the circuit board 200 in advance and then the semiconductor laser coupling device is mounted at a predetermined position on the circuit board 200. The circuit board 200 assembled in this manner is placed on and fixed to the bottom cover 240B coupled to the heat-dissipating block 240C. In order to sufficiently dissipate the heat of the semiconductor laser coupling device, it is important to reliably fix the semiconductor laser coupling device to the heat-dissipating block 240C. For example, the heat dissipating block 240C is secured to the semiconductor laser coupling device by fastening screws into threaded holes made in the semiconductor laser coupling device (the threaded holes are not shown in the drawing). A top cover 240A is placed on the top surface of the circuit board 200 (not shown in FIG. 7(a) and shown by broken lines in FIG. 7(b)), so that the parts are assembled into one device.

According to the present invention, the optical coupling of the optical fiber to the semiconductor laser element or the semiconductor laser light receiving element is not changed by an environmental change, and so a stable optical output can be produced. Further, since the case can be made of plastic, which is inexpensive and is manufactured by mass production, the semiconductor laser coupling device can be produced at a low cost.

Further, since the semiconductor laser element or the semiconductor light receiving element is received in the case and then is potted with resin or provided with a metal cover, it can be operated without being subjected to an external force or the moisture or the dust in the atmosphere. Further, since the semiconductor laser coupling device uses an external output terminal corresponding to the international standard, the semiconductor laser coupling device is easily mounted on an external board.

What is claimed is:

1. A semiconductor laser coupling device comprising a semiconductor laser element or a semiconductor light receiving element, an optical fiber optically coupled to the semiconductor laser element or the semiconductor light receiving element, a substrate on which said semiconductor laser element or said semiconductor light receiving element and said optical fiber are mounted, and a case for receiving said substrate, wherein said case has a plurality of side walls, and a heat-dissipating member is arranged in the bottom of said case and a reinforcing member extends along at least two side walls of said case.

2. A semiconductor laser coupling device according to claim 1, wherein said heat-dissipating member is formed of metal or ceramic and said reinforcing member is formed of metal and the main material constituting the case is resin, ceramics, or a mixture of the resin with metal powder or ceramics, and wherein at least portions of said heat-dissipating member and said reinforcing member are arranged at predetermined positions and all at least partially embedded in the main material which constitutes the case.

3. A semiconductor laser coupling device according to claim 2, wherein, a metal lead frame of a single material is fabricated into a three-dimensional continuous member constituting said heat-dissipating member and the reinforcing member and is at least partially embedded in said main material which constitutes the case.

4. A method of mounting on a circuit board a semiconductor laser coupling device comprising a semiconductor laser element or a semiconductor light receiving element, an optical fiber optically coupled to the semiconductor laser element or the semiconductor light receiving element, a semiconductor laser coupling device substrate on which the semiconductor laser element or the semiconductor light receiving element and the optical fiber are mounted, and a case for receiving the substrate, said method comprising the steps of:

bonding the semiconductor laser element or the semiconductor light receiving element to the semiconductor laser coupling device substrate;

fixing the optical fiber at a position where the light-emitting end surface of the semiconductor laser element or the light-receiving end surface of the semiconductor light receiving element is aligned with the end of the optical fiber;

receiving in the case having a plurality of side walls the substrate to which the semiconductor laser element or the semiconductor light receiving element is fixed, the case being provided with a reinforcing member extending along at least two of the side walls of the case for suppressing of deformation of the case;

electrically connecting the semiconductor laser element or the semiconductor light receiving element to an external input terminal; and arranging and electrically connecting a hybrid circuit with electrical parts comprising an IC, a resistance, and a condenser which drive and control the semiconductor laser coup ling device on the circuit board provided with PVA, DIP, SOP terminals and electrically connecting them to constitute a module on which said semiconductor laser coupling device is arranged and fixed.

5. A semiconductor laser coupling device according to claim 1, wherein said case has a substantially rectangular configuration with four side walls, and said reinforcing member extends along each of the side walls of said case so as to form a closed loop of said reinforcing member.

6. A semiconducting laser coupling device comprising a semiconductor laser element or a semiconductor light receiving element, an optical fiber optically coupled to said semiconductor laser element or said semiconductor light receiving element, a substrate for mounting thereon said semiconductor laser element or said semiconductor light receiving element in said optical fiber and a case for receiving said substrate, said case having a plurality of side walls and having a heat-dissipating member arranged in a bottom of said case, and a reinforcing member which suppresses deformation of said case extending along at least one side wall of said case.

7. A semiconductor laser device according to claim 6, wherein said reinforcing member extends along said at least one side wall of said case so as to surround said semiconductor laser element or said semiconductor light receiving element.

8. A semiconductor laser device according to claim 6, wherein said reinforcing member extends along at least two adjacent side walls of said case.

9. A semiconductor laser device according to claim 6, wherein said reinforcing member extends along each of the plurality of side walls of said case.

10. A semiconductor laser device according to claim 6, wherein said reinforcing member is at least partially embedded in said at least one side wall of said case.

11. A semiconductor laser device according to claim 6, wherein said case has an opening at the top thereof and said reinforcing member extends along said at least one side wall of said case in proximity to the opening at the top of said case.

12. A semiconductor laser device according to claim 6, wherein said case is generally rectangular in cross-section.

* * * * *